March 4, 1947.  A. S. VOLPIN  2,417,025
HAMMER-LOCK UNION
Filed June 21, 1943  2 Sheets-Sheet 1

INVENTOR.
A. S. VOLPIN
BY Lester B. Clarke.
ATTORNEY.

March 4, 1947.

A. S. VOLPIN 2,417,025

HAMMER-LOCK UNION

Filed June 21, 1943

INVENTOR.
A. S. VOLPIN
BY
Lester B. Clark
ATTORNEY.

Patented Mar. 4, 1947

2,417,025

UNITED STATES PATENT OFFICE 2,417,025

HAMMER-LOCK UNION

Alexander S. Volpin, Houston, Tex., assignor to Knud I. Bruun, Houston, Tex., doing business as Turbolite Company, Houston, Tex.

Application June 21, 1943, Serial No. 491,607

6 Claims. (Cl. 285—177)

The invention relates to a pipe or rod union or coupling of the type which can be locked or unlocked by a hammering action upon a locking member.

In various lines of industry it is desirable to have a pipe or rod connection wherein a quick coupling or release can be accomplished without rotation of the pipe or rod and which coupling will retain the pressure within the pipe or transmit the load upon the rods.

There have been certain types of unions heretofore devised wherein a single bolt is provided to tighten or loosen the coupling, but the threads on such bolts become worm and damaged and the bolt itself does not retain its original shape which results in a loose connection.

The present invention contemplates a union having a slidable pin therein which can be hammered into a wedging position to lock the parts together and which can be again hammered to release it from wedging position with the result that an exceptionally fast coupling or uncoupling of the pipes can be accomplished.

It is one of the objects of the invention to provide a hammer lock union for pipe and rod couplings.

Another object of the invention is to provide a pipe union wherein a member on each of the pipe ends will be coupled together with a clamping ring and the ring in turn locked to one of the members by a piece to be hammered into locking position.

Another object of the invention is to provide a wedge pin for locking the clamping member of pipe unions in position.

Another object of the invention is to provide a clamp ring for threaded connection to one member and a locking connection to another member.

Still another object of the invention is to provide a pipe union having a sealing arrangement to prevent leakage from the pipe and which may be locked in sealing position.

A still further object of the invention is to provide a clamp ring for pipe unions which may be hammered into clamping position and then locked into such position by the hammering of a wedge pin carried thereby.

Other and further objects of the invention will be readily apparent when the following description is considered in connection with the accompanying drawings wherein Fig. 1 is a longitudinal sectional view of a pair of pipe ends coupled together with the hammer lock union, which section is taken on the line 1—1 of Fig. 2.

Figure 1:
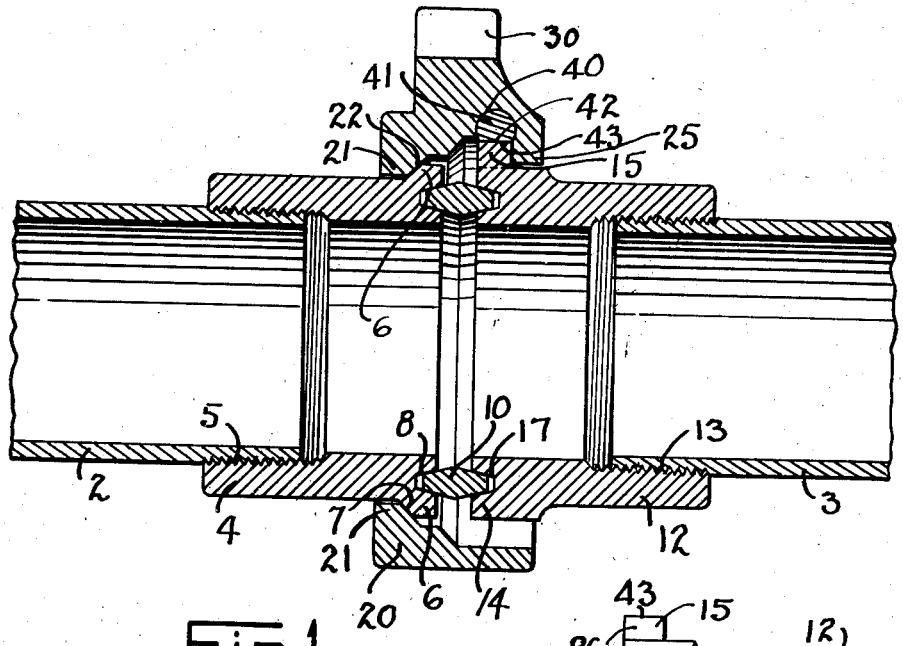

In Fig. 1 the pipe ends 2 and 3 are to be coupled together and the pipe 2 has a member or bushing 4 threaded at 5 thereon. This bushing extends beyond the end of the pipe and has an enlarged flange 6 thereon which provides a beveled or tapered seat 7. This member has an annular groove 8 in the end thereof which is arranged to receive the tapered faces of a metal seal ring 10 which may be of any desired type of material.

Figure 2:
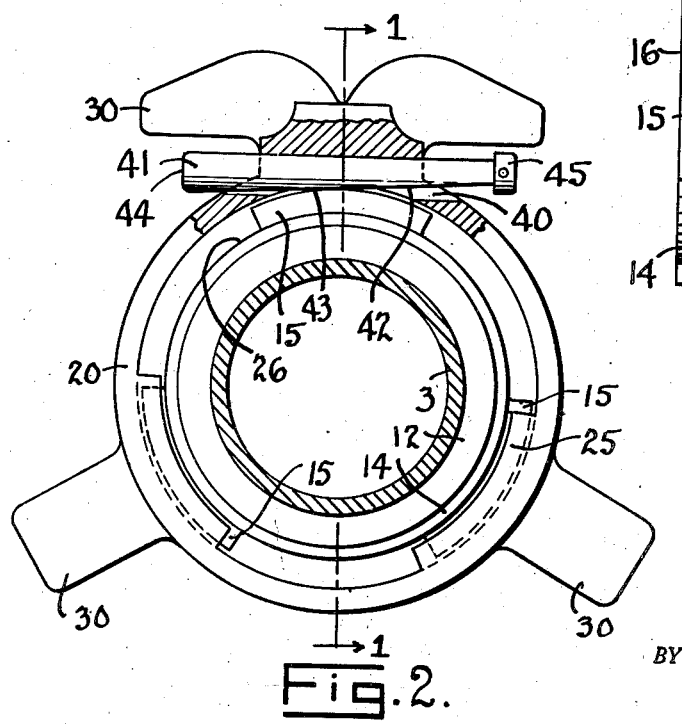
Fig. 2 is an end view with certain parts in section illustrating the relative position of the parts when the union is locked.
Figure 3:
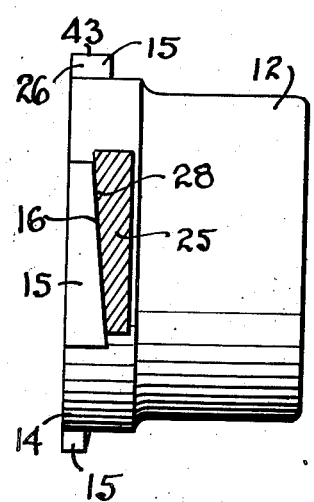
Fig. 3 shows one of the pipe ends with one of the lugs of the clamping ring engaging the member to illustrate the clamping action.

The pipe end 3 has a member or head 12 thereon which is threaded at 13 to the pipe 3 and this member 12 has an enlarged head portion 14 which is provided with spaced outstanding lugs 15 as best seen in Figs. 2 and 3. It will be noted that the face 16 of each of these lugs is arranged at an incline with respect to the circumference of the pipe. The end of this head has a groove 17 to receive the opposite edge of the seal ring 10 so that when the members 4 and 12 are clamped or drawn together that a seal will be formed with the ring 10 so as to confine any material within the pipe and prevent leakage.

In order to draw the members 4 and 12 together to form a seal with the ring 10 a clamp ring 20 is shown as fitted about the members 4 and 12. This ring has a flange 21 thereon which is formed internally with a beveled face 22 which is complementary with the beveled face 7 so that movement of the clamping ring 20 to the right as seen in Fig. 1 will pull these two beveled faces together so as to exert a thrust on the member 4.

In order to obtain this clamping action the ring 20 is provided with a plurality of inwardly projecting lugs 25 which are arranged in spaced relation so that the ring may be passed longitudinally over the member 12 in the spaces 26 between the adjacent lugs 15. A turning movement of the ring 20 then brings the beveled faces 28 of the lugs 25 into engagement with the tapered face 16 of the lugs 15. Additional turning movement draws the member 12 into the clamping ring in an amount as may be permitted by the seal ring 10 to obtain a tight joint. In order to turn the clamping ring 20 with ease a plurality of projections or hammer lugs 30 are arranged circumferentially thereof. These may be struck sharply with a hammer or other instrument so as to effect a wedging of the lugs 15 and 25 so as to clamp the members 4 and 12 tightly in position.

It has been found in practice that a clamp ring thus constructed does not always remain in clamping position due to expansion and contraction of the parts or due to vibration of the pipe or rod. The present clamping ring 20 has therefore been provided with an opening 40 which might be said to be tangential with respect to the central opening therethrough. It is, as a matter of fact, tangential with respect to the periphery of the lugs 15 when the lug 25 is engaged therewith as seen in Figs. 1, 2 and 3. A pin 41 is slidably arranged in the opening 40 and has a tapered or beveled face 42 which is best seen in the sectional view of Fig. 1 as being a flat surface arranged to engage the periphery 43 of the lug 15. The opening 40 is shown as being circular so as to form a frictional engagement with the periphery of the pin. As seen in Fig. 2 the pin may be hammered on the end 44 so as to drive it into wedging position against the surface of the opening 40 and away from the lug 15. It seems obvious that a quick wedging and locking action can be obtained with one or two blows with a hammer or some other instrument and that a frictional engagement of the pin with the opening 40 and the slight taper of the face 42 will firmly lock the pin in position and insure the locked arrangement of the clamping ring 20.

The pin 40 has a retainer collar 45 on the small end thereof to prevent its falling out of the opening 40 when it is loosely positioned therein.

In order to release the clamping ring 20 it is only necessary to strike the pin 41 on the small end at the collar 45 to knock it loose from locking position and another blow on any one of the projections 30 releases the union.

It seems apparent that a simple and economical construction has been provided which permits the ready connection and locking of the pipe or rod ends together without the use of any special tools or wrenches.

Figure 4:
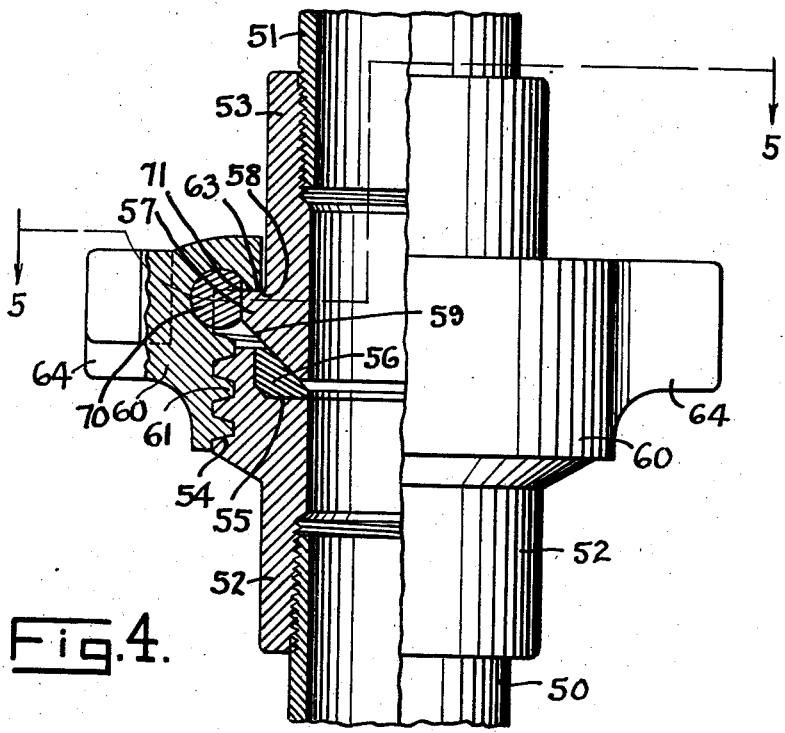
Fig. 4 is a side elevation with one part in section illustrating a modified form of the hammer lock union.
Figure 5:
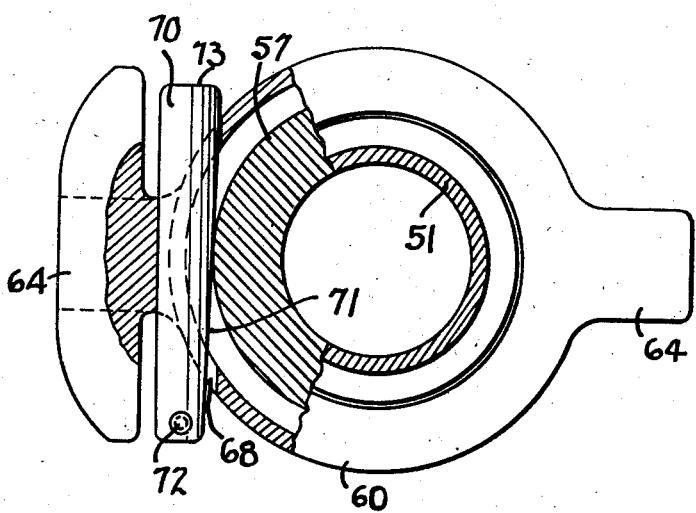
Fig. 5 is a connection taken on the line 5—5 of Fig. 4 to illustrate the position of the locking pin.

Figs. 4 and 5 show a modified arrangement of the construction wherein the pipes 50 and 51 carry the members 52 and 53 respectively. The member 52 is threaded to the pipe 50 and is formed on its periphery with a coarse or acme thread 54. Internally the member 55 is arranged to receive the packing gasket 56. The member 53 is provided with an outstanding flange 57 which provides a shoulder 58. The end of the member 53 is beveled at 59 to form a face which will abut with a complementary beveled face on the packing gasket 56. When the members 52 and 53 are brought toward each other a seal is thus formed.

A clamping ring 60 is threaded internally at 61 with threads which are complementary with the threads 54 and the opposite edge of the ring is provided with an inwardly directed lip 63 which is arranged to abut the shoulder 58 so that turning of the ring 60 causes the threads 61 to draw the members 52 and 53 together. The projections 64 on the ring may be struck with a hammer or other instrument to turn the clamping ring.

The opening 68 is tangential with respect to the periphery of the flange 57 as best seen in Fig. 5 and is arranged to receive the lock pin 70 which has a beveled or tapered face 71 thereon. A cross rivet 72 prevents loss of the pin.

It seems obvious that when the clamp ring has been hammered into position to draw the members 52 and 53 together that then a blow on the end 73 of the locking pin will cause the face 71 to wedge on the periphery of the flange 57 and lock the pin against rotation or release. This locking pin 70 can be released by striking a blow on the small end thereof to knock it loose from wedging position.

Broadly the invention contemplates a hammer lock union which can be hammered into position and locked by a further hammering action and wherein release can also be accomplished by hammering the lock to loosen it and also hammering the clamping ring.

What is claimed is:

1. A pipe or rod coupling including a bushing for connection to one pipe, a head for connection to the other pipe, a clamp ring engaging said bushing, interfitting portions on said head and ring to exert a force pulling said bushing and head together upon relative rotation, and tapered means carried by and slidable in said ring to engage said head to wedge the ring and head against relative rotation, said means being adapted to be hammered into and out of locking position.

2. A hammer lock union for pipe connections including a member on each pipe end, a ring rotatable on one member, interfitting tapered portions on the other member and said ring to draw the two members together upon rotation of the ring relative to said member on which it is mounted, and a tapered locking piece carried by the ring to tangentially engage the other one of said members so as to be hammered into locking position, said piece having a tapered face to gradually wedge against said other member.

3. A pipe union including a member for connection to each pipe end, an enlarged flange on one member, a clamp ring having a complementary flange therein to form a seal with said first flange, outstanding circumferentially spaced lugs on said other member, complementary spaced lugs and recesses formed in said ring, a seal ring between said members to be clamped therebetween upon rotation of the clamping ring, and a slot and slidable pin in said first ring to engage and lock said ring against rotation relative to said lugs.

4. A pipe union including a member for connection to each pipe end, an enlarged flange on one member, a clamp ring having a complementary flange therein to form a seal with said first flange, outstanding circumferentially spaced lugs on said other member, complementary spaced lugs and recesses formed in said ring, a seal ring between said members to be clamped therebetween upon rotation of the clamping ring, and a slot and slidable pin in said first ring to engage and lock said ring against rotation relative to said lugs, said pin having a wedge area thereon and projecting from the ring to be hammered into and out of locking position.

5. A pipe union including a member for connection to each pipe end, a clamp ring threaded on one member, interfitting flanges on the other member and ring, and a locking member slidable in said ring to wedge against one of said members to lock said ring against movement.

6. A pipe union including a member for connection to each pipe end, a clamp ring threaded on one member, interfitting flanges on the other member and ring, and a locking member slidable in said ring to wedge against one of said members to lock said ring against movement, said locking member projecting from the circumference of said ring to be hammered into and out of locking position.

ALEXANDER S. VOLPIN.

REFERENCES CITED

The following references are of record in the file of this patent:

UNITED STATES PATENTS

| Number | Name | Date |
|---|---|---|
| 1,613,644 | Costello | Jan. 11, 1927 |
| 688,860 | Kay et al. | Dec. 17, 1901 |
| 2,101,406 | McKeever | Dec. 7, 1937 |

FOREIGN PATENTS

| Number | Country | Date |
|---|---|---|
| 332,173 | Italian | Nov. 25, 1935 |